United States Patent
Adrian

(10) Patent No.: US 7,464,478 B2
(45) Date of Patent: *Dec. 16, 2008

(54) WORKPIECE CENTER AND EDGE FINDER HAVING VISUAL LIGHT INDICATOR

(76) Inventor: Merle Skip Adrian, P.O. Box 44, Piedra, CA (US) 93649

( * ) Notice: Subject to any disclaimer, the term of this patent is extended or adjusted under 35 U.S.C. 154(b) by 42 days.

This patent is subject to a terminal disclaimer.

(21) Appl. No.: 11/603,685

(22) Filed: Nov. 21, 2006

(65) Prior Publication Data

US 2007/0068020 A1 Mar. 29, 2007

(51) Int. Cl.
*G01B 11/27* (2006.01)
(52) U.S. Cl. .......................... 33/286; 33/642; 33/DIG. 21
(58) Field of Classification Search .................... 33/227, 33/262, 263, 275 R, 286, 613, 638, 642, 645, 33/DIG. 21
See application file for complete search history.

(56) References Cited

U.S. PATENT DOCUMENTS

| | | | | |
|---|---|---|---|---|
| 4,078,869 A | * | 3/1978 | Honeycutt | 33/286 |
| 5,245,759 A | * | 9/1993 | Pearson | 33/638 |
| 5,276,975 A | * | 1/1994 | Fisher | 33/642 |
| 6,050,816 A | * | 4/2000 | Phoenix et al. | 433/55 |
| 6,124,935 A | * | 9/2000 | Matthews | 33/286 |
| 6,643,019 B1 | * | 11/2003 | Jeanneret | 33/286 |
| 6,796,038 B2 | * | 9/2004 | Humphries | 33/265 |
| 7,140,118 B2 | * | 11/2006 | Adrian | 33/286 |
| 2002/0038513 A1 | * | 4/2002 | Kallesen et al. | 33/286 |
| 2006/0112581 A1 | * | 6/2006 | Nortmann et al. | 33/638 |

* cited by examiner

*Primary Examiner*—G. Bradley Bennett
(74) *Attorney, Agent, or Firm*—Richard A. Ryan

(57) ABSTRACT

A precise center and edge finder in which the position of the center or edge of a workpiece or an aperture thereon is directly located with respect to a work tool. In one embodiment, the finder has a shank for attachment to a chuck. In another embodiment, the shank has a chamber for receiving a nozzle or other projecting work component. A laser diode directs a beam of light toward the workpiece. The beam of light projects a fine dot in direct alignment with the centerline of the work tool to the center or edge of the workpiece. A dot adjusting unit can be used to adjust the intensity and size of the dot. Alternatively, the finder projects a ring-shaped light to directly align an aperture on the workpiece with the work tool or a cross-hair shaped light to align the workpiece with an x-y axis of the work tool.

23 Claims, 7 Drawing Sheets

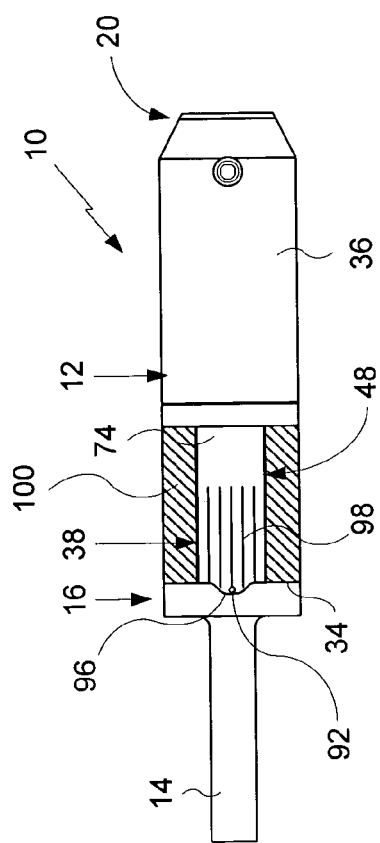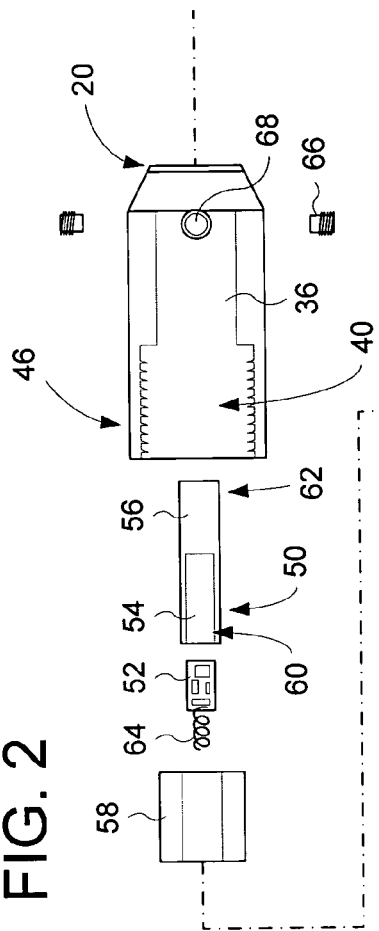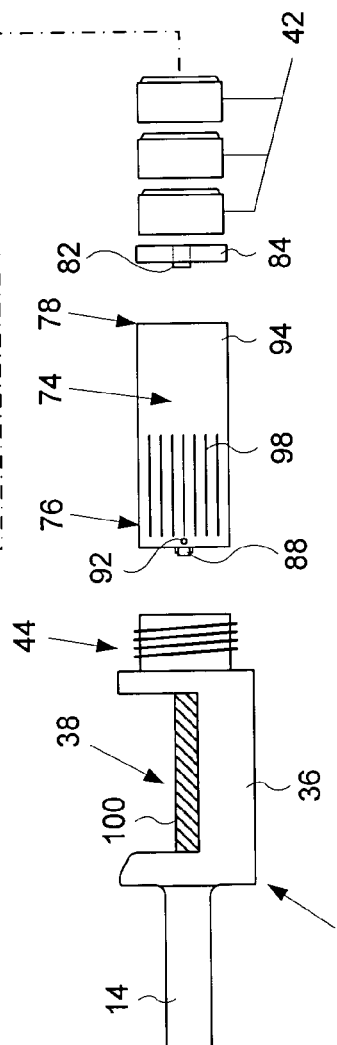

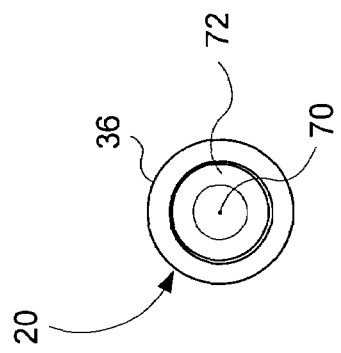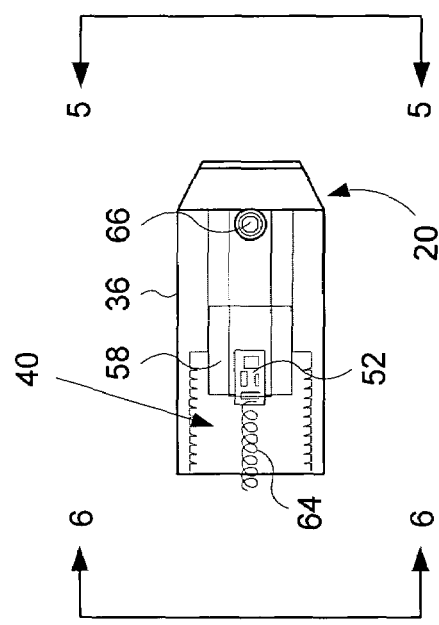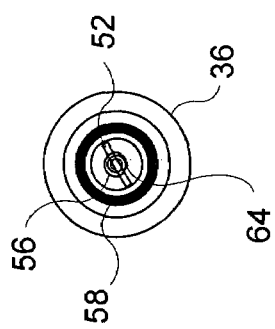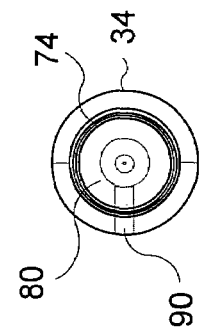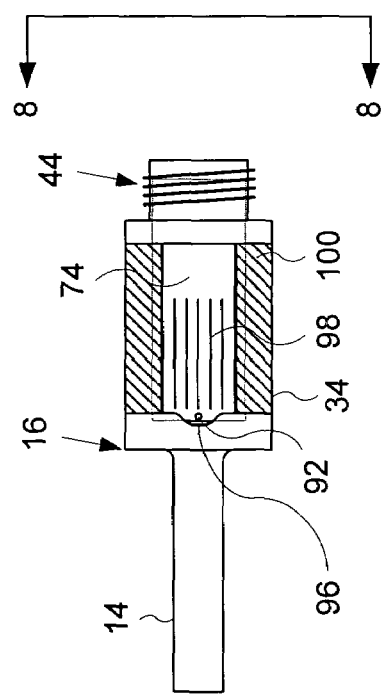

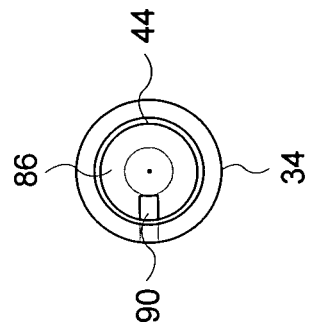
FIG. 10
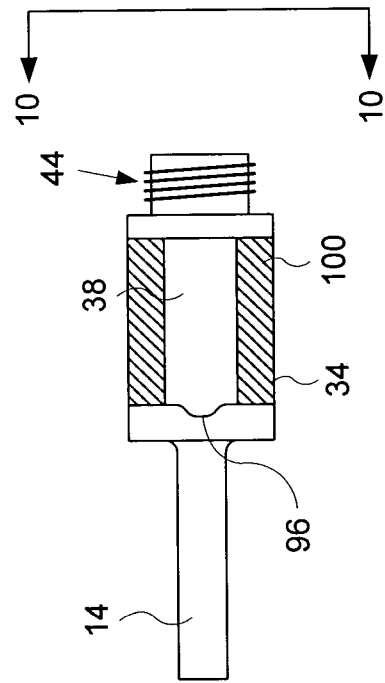
FIG. 9
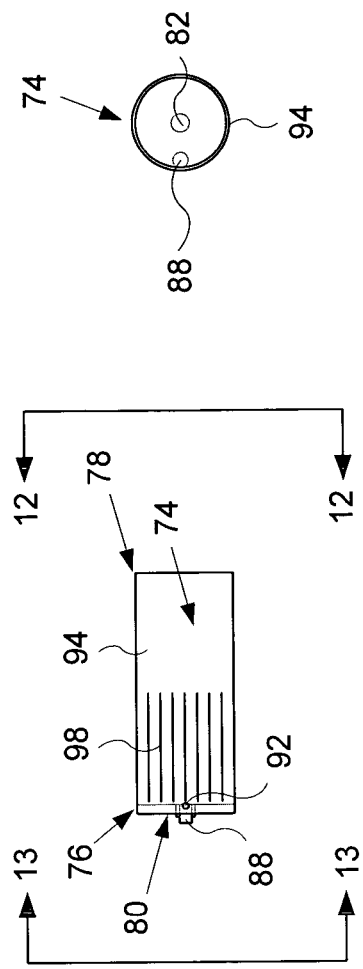
FIG. 11
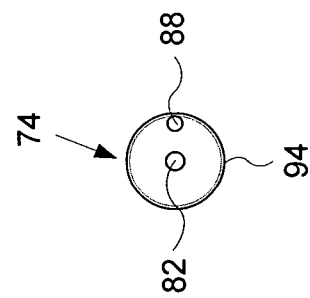
FIG. 12
FIG. 13

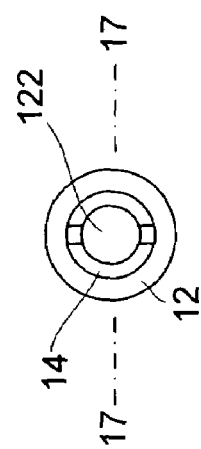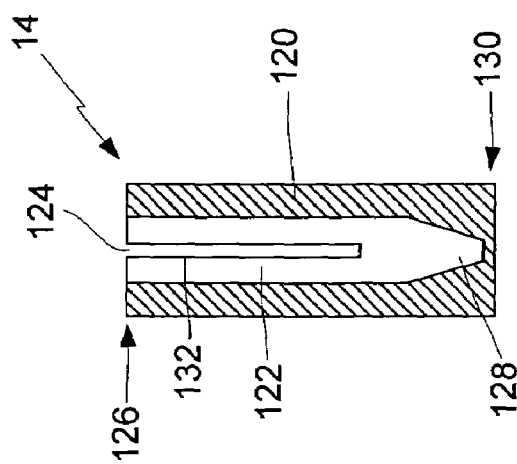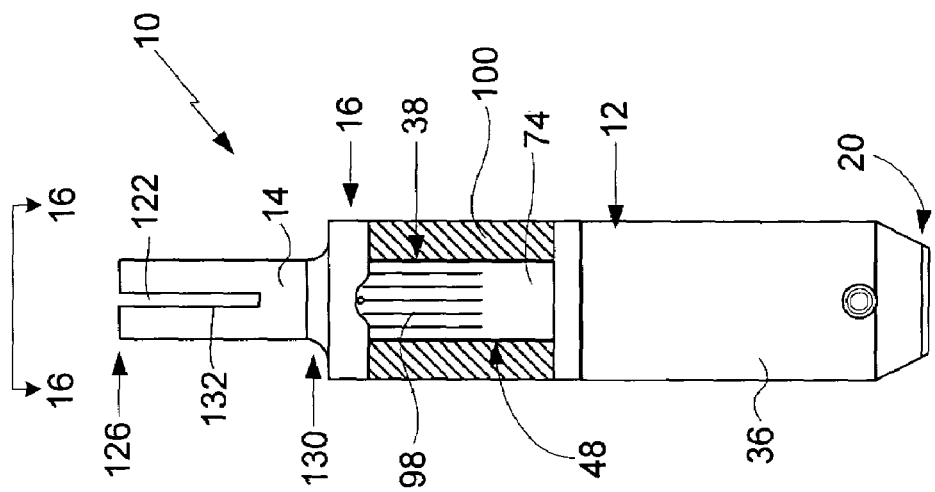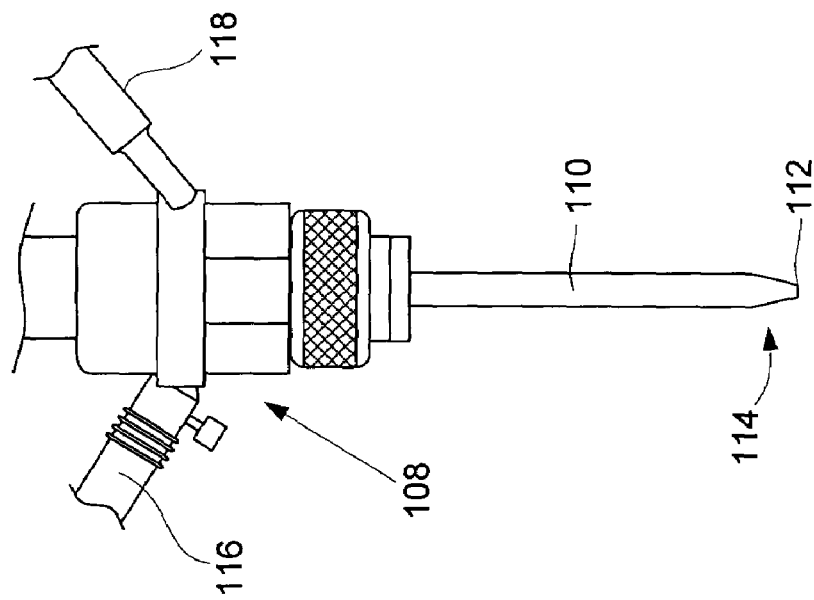

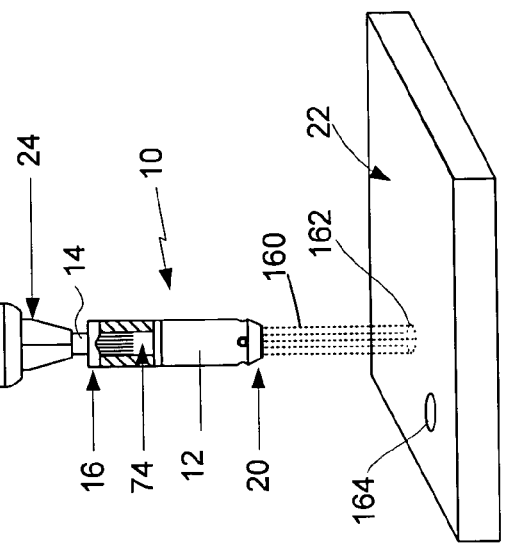
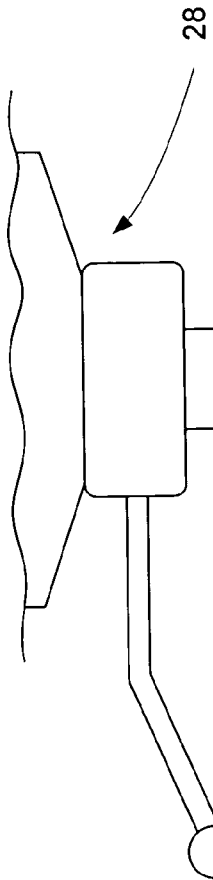
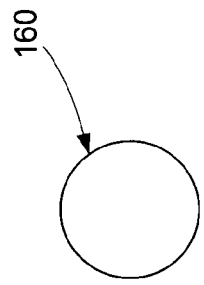
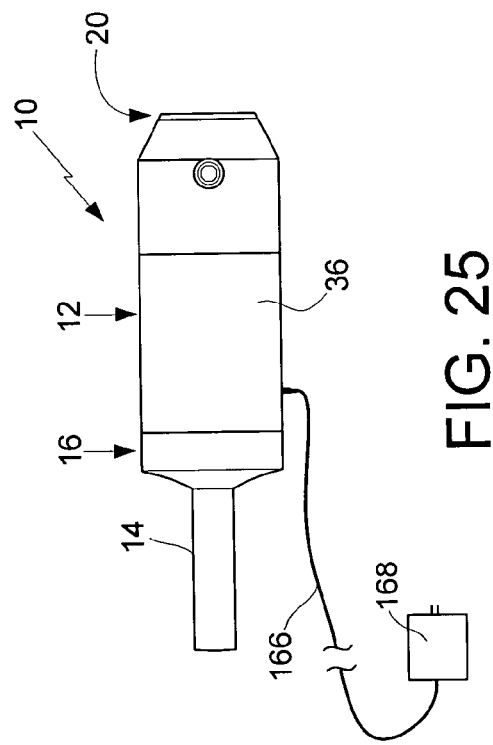
FIG. 22
FIG. 23
FIG. 24
FIG. 25

WORKPIECE CENTER AND EDGE FINDER HAVING VISUAL LIGHT INDICATOR

CROSS-REFERENCE TO RELATED APPLICATIONS

This patent application claims the benefit of U.S. patent application Ser. No. 11/184,405 filed Jul. 19, 2005, patented as U.S. Pat. No. 7,140,118 issued Nov. 28, 2006, which claimed the benefit of U.S. Provisional Application No. 60/609,331 filed Sep. 13, 2004.

BACKGROUND OF THE INVENTION

A. Field of the Invention

The field of the present invention relates generally to positioning devices utilized to precisely position a work tool, such as a drilling or milling machine, above a workpiece. More specifically, this invention relates to such devices that utilize a visual mechanism to locate the precise center, specific spot or edge of the workpiece so that such position may be used as a reference point for performing work operations. Even more specifically, this invention relates to such devices that utilize a light beam, such as from a laser, as the visual mechanism.

B. Background

When working a piece of material with a milling machine or similar type of work tool, the machinist must first identify a reference or starting point from which the various dimensions and locations for the milling work to be performed on the workpiece will be measured. As known by those skilled in the art, failure to properly identify the reference point will generally result in a waste of time and material as the milling work is improperly positioned on the workpiece. Once found, this reference or starting point on the workpiece is then set in corresponding relationship with the centerline of the working part of the milling machine or other work tool so that the milling work will be performed at the correct location. The most common reference point utilized by most machinists is either the center or an edge of the workpiece. From the center or edge of the workpiece, dimensions are utilized to properly position the workpiece under the milling machine so that the work operation is performed at the desired location. Typically, the workpiece is generally clamped or otherwise held in place on a table under the working part of the milling machine. For the center of the workpiece, the machinist will typically first manually measure, locate and then mark the center with a punch. Once the center or edge of the workpiece is found with respect to the centerline of the milling tool, which typically requires some adjustments, the machinist can perform the desired operations at the correct location. A similar type of process can also be used for identifying the position of holes, which may need to be drilled, tapped, edges chamfered, countersunk or have other work done, to be drilled into or through the workpiece. Once the hole locations are identified by prick-punching the workpiece, the ability to accurately drill at the hole position is somewhat based on the machinist's ability to position the workpiece with regard to the centerline of the drill press spindle.

The procedures and tools utilized by most machinists to locate the center or edge of a workpiece relative to a milling machine or other work tool indirectly locate the reference point, in that they require the machinist to make measurement adjustments. A common method utilized to find an edge of a workpiece is generally referred to as the contact or bump method. In this method, a simple piece of round stock is placed in the mill spindle and the work tool is hand cranked to gently abut the edge of the workpiece against the round stock. To align the work machine with the edge of the workpiece, the machinist then raises the round stock above the workpiece and moves the workpiece over half the diameter of the round stock. The micrometer dial setting at this position is zeroed to correspond to the edge of the workpiece, thereby aligning the work tool (i.e., the spindle centerline) with the plane running through the edge of the workpiece. Although the contact or bump method is quick and simple, it is well known that it is generally not that accurate due to the inherent problems associated with trying to recognize when the contact occurs and the elasticity of the materials involved. In addition, to the inherent accuracy problems, it is not that uncommon for machinists, particularly relatively inexperienced or hurried machinists, to forget to take into account the one-half of the diameter of the round stock used as the edge finder. Another problem known to be associated with this method of edge finding is that too much contact against the workpiece, which for certain metals is not that much contact, can dent or otherwise damage the workpiece.

Another method for finding the edge of a workpiece utilizes a tool commonly known as a wiggler, which has been used by machinist for over a century. Most wiggler sets come with an edge finder component that has a generally mushroom-shaped disk contact at the end of the wiggle shank opposite that which fits into the collet, typically in a ball and socket type of arrangement. As with the contact method described above, the workpiece is moved towards the spinning edge finder until it gently touches the disk contact and steadies the wiggling. The workpiece is then slowly dialed further towards the edge finder until it is spinning true (i.e., no wiggle). At the point the edge finder starts to slip sideways from the drag of the spinning disk against the workpiece, the machinist has found the edge of the workpiece. As with the contact method, the machinist then raises the edge finder and dials in half of its diameter, typically 0.100 inches, to align the spindle centerline with the edge plane of the workpiece. Although the wiggler edge finder is generally considered to be very accurate for routine machine work and good enough for most high precision work, it is known to be frustrating to utilize due to the fact that it has to be reset for each edge contact.

The typical wiggler set also includes a pointer component that fits within the same wiggle shank, but has a pointed end instead of the mushroom-shaped disk contact for the edge finder component. When the wiggle shank is chucked into the milling machine or other work tool and run, the end of the pointer will spin in a random-angled cone. The machinist, typically utilizing his or her thumbnails or other parts of their fingers, will guide the end to concentricity to correspond with the work tool spindle axis. The machinist then guides the workpiece to position the center punch mark, using visual alignment, under the pointed end to align the mark with the spindle axis. Unfortunately, manually adjusting the wiggler point to concentricity can result in injury to the machinist's finger(s), particularly for the novice machinist. If the wiggler is guided past center, the pointed end has a tendency to wildly spin, requiring realignment. Although this method can be very accurate, it does require the machinist to eyeball the alignment by mentally projecting a straight line to the marked center point of the workpiece.

Another well known mechanical edge finder utilizes a spring loaded conical disc that spins while free of the workpiece and then suddenly kicks or slips sideways when contact with the edge of the workpiece is obtained. Unlike the wiggler edge finder, however, the disc of this type of edge finder only slips a certain amount and then goes no further. As a result, the machinist can back up and try again without having to reset the contact by hand. Once the edge is found, the machinist moves the workpiece, generally by moving the mill table, over one-half the diameter of the edge finder to align the spindle axis with the plane of the workpiece edge. Some of these types of edge finders include a conically-shaped center finder having a pointed end that is utilized in the same manner as that described above for the wiggler center finder component.

A number of prior art center and/or edge finders are described in issued patents. For instance, U.S. Pat. No. 3,999,299 to Johnson describes an edge finder having a housing adapted to be received by the chuck on a work tool spindle, a slide biased against the housing by a spring that permits lateral movement of the slide and an outwardly extending finger that is rotatably attached to the slide at one end and shaped with a flat face at the other end to engage the side or edge of the workpiece. The plane of the flat face is configured to be in alignment with the axis of the work tool. Like the prior art devices set forth above, the workpiece is moved towards the edge finder until the edge is brought into contact with the flat face, at which time the slide moves at a right angle to the direction the workpiece is traveling indicating alignment with the edge. Unlike the above devices, however, no measurement adjustment is required. U.S. Pat. No. 5,217,336 to LeBlanc discloses an edge finder having an elongated body with a push pin at the semi-circular cross-section lower end that is contacted by the edge of the workpiece to operatively engage a lever connected to a dial indicator. The plane of the flat side of the lower end, which comes into contact with the workpiece edge when the pin is fully engaged, is in alignment with the axis of the spindle, thereby eliminating the need to factor in an adjustment. U.S. Pat. No. 4,429,463 to Angell discloses an electromechanical datum point locator tool that utilizes a cylindrical tip assembly that has an electrically conductive sleeve which causes a light to be emitted from the circumference of the tool's cylindrical housing when contact with the edge of the workpiece is obtained. The machinist must adjust for one-half the diameter of the tool's tip. U.S. Pat. No. 5,276,975 to Fisher describes an audible-visual edge finder having a working end member at the end of a cylindrical shank. The working end member has a flat that is configured to make an audible sound when it contacts the workpiece and to cause the finder to vibrate radially, thereby enhancing the sideways jump, to visually signal contact with the workpiece. Like the above patent, the machinist must adjust for one-half the diameter of the working end member. U.S. Pat. No. 4,622,751 to Berg describes an electromechanical measuring device having a workpiece contacting finger connected to a strain gauge or pressure transducer to locate the center of circular bores and pins relative to the axis of rotation of the spindle.

While the forgoing prior art devices and patents describe center and/or edge finders that are configured to locate and position the axis of the spindle above the center or edge of a workpiece, they all have limitations that either reduce their accuracy or effectiveness. For instance, the devices that require the machinist to add one-half the width or diameter of the tool are indirect methods of finding the workpiece edge or center, which can be forgotten by the novice or rushed machinist. Naturally, this mistake generally results in a waste of time and material. All of the aforementioned devices require the machinist to push the workpiece into contact with the edge finder in order to locate the edge of the workpiece, a process that always presents the potential of damaging the workpiece or precision tool if too much force is applied. A number of the aforementioned devices are not configured or useful for finding the center of a workpiece. What is needed, therefore, is a workpiece center and edge finder that provides direct indication of placement of the spindle axis over the edge or center of the workpiece without requiring physical contact between the workpiece and the finder tool. The preferred center and edge finder should be adaptable to a wide variety of work tools, including milling machines, lathes and the like. The preferred center and edge finder should be relatively simple to use.

SUMMARY OF THE INVENTION

The workpiece center and edge finder of the present invention provides the benefits and solves the problems identified above. That is to say, the present invention discloses a center and edge finder that is configured to allow the machinist to easily and directly position the axis of the spindle above the center or edge of a workpiece. The workpiece center and edge finder of the present invention utilizes a visual beam of light to make contact with the center or edge of the workpiece, thereby eliminating the need to have physical contact between the workpiece and the tool, avoiding the inherent risk of damaging the workpiece and/or tool and eliminating several steps required for indirect and/or contact types of devices. The preferred embodiment of the present invention has a minimum of moving parts, thereby increasing reliability and simplifying the use of the tool to position the spindle over the center or edge of a workpiece. As such, the center and edge finder of the present invention reduces the likelihood of errors and the time necessary to locate the center or edge of a workpiece. The center and edge finder of the present invention is adaptable to a wide variety of different types of work tools, including milling machines, lathes and the like.

In one general aspect of the present invention, the center and edge finder is configured for use with a work tool, such as one having a rotating spindle and a chuck attached thereto, such as a milling machine, lathe or the like. In a preferred embodiment of the present invention, the center and edge finder comprises a support member, preferably a housing, that has a first end and a second end with a light source capable of generating a beam of light and a source of electricity. In the preferred embodiment, the light source and source of electricity are disposed in the housing, the light source is a laser such as provided from a laser diode module, and the source of electricity is one or more batteries. The first end of the housing is configured to be engaged by the work tool and secured thereby such that the second end of the housing is generally disposed in spaced apart relation above the workpiece. In the preferred embodiment, a shank is located at the first end and secured to the work tool by the chuck or collet. The second end of the housing has a discharge aperture that is configured to allow the light from the light source to pass therethrough and towards the workpiece. Preferably, the discharge is sized and configured to narrow the beam of light from the light source to provide a fine dot at the workpiece. An on/off mechanism allows control of the light source. In the preferred embodiment, the electrical circuit includes the batteries, light source and housing and the on/off mechanism is configured to electrically separate the batteries from the housing, thereby breaking the electrical circuit and turning off the light source. A battery holder is configured to hold the batteries and have a projecting member that selectively moves from engagement with a recess portion of the housing that electrically connects the housing and batteries to out of engagement with the recess portion so as to electrically separate the housing from the batteries. In the preferred embodiment, the laser diode module is disposed in a light tube at the second end of the housing that is electrically connected to the housing by one or more adjusting members, which are preferably threaded screws or the like. In addition to providing electrical contact, the adjusting members allow the user to align the beam of light so that it is in alignment with centerline of the spindle or other operating part of the work tool. In use, the beam of light from the finder is directed downward towards the workpiece and the workpiece is moved until the beam of light either hits the previously marked center spot or is directed along the edge of the workpiece, thereby aligning the centerline of the spindle with the center or edge of the workpiece. Use of the center and edge finder of the present invention eliminates the need to make adjustment calculations to the determine the true center or edge of the workpiece.

In an alternative embodiment of the center and edge finder of the present invention, the shank has a shank chamber that is sized and configured to receive a work component, particularly a projecting work component, of a work tool therein. In one configuration, the work tool is a waterjet cutting tool and the work component is a nozzle. Preferably the shank chamber is configured to slide onto the work component and be secured by the engagement of the shank walls against the work component. Alternatively, the shank is secured to the work component by a securing mechanism such as a screw or the like. For nozzles and other work components having a tip, preferably the distal end of the shank chamber has a tapered section to receive the tip so as to align the center and edge finder with the centerline of the work component or work tool so as to precisely perform a work operation at the desired location.

In another alternative embodiment, the center and edge finder is used with a dot adjusting unit to adjust the intensity of the beam of light and the size of the fine dot projected thereby onto the workpiece. In a preferred embodiment, the dot adjusting unit is a separate component that slides onto the second end of the finder housing and is rotatably disposed thereon. Alternatively, the dot adjusting unit can be integral with the center and edge finder. In one embodiment, the dot adjusting unit has a polarizing element, such as a section of linear polarizing film, at an orifice. The dot adjusting unit can comprise a cap housing having a cap cavity that fits onto the housing of the finder.

In another alternative embodiment, the center and edge finder of the present invention is configured to project a cross-hair shaped beam of light to place a cross on the workpiece to allow the operator to directly orient the workpiece to the x-y axis of the work tool.

In another alternative embodiment, the center and edge finder projects a circular beam of light that places a ring-shaped light on a workpiece so the user can align the centerline of the work tool with an aperture on the workpiece instead of the center or an edge of the workpiece. The ring-shaped light can be made up of a plurality of fine dots in a ring pattern or it can be a fine, solid circle formed by projecting the beam of light through a lens having a circle cut therein. By raising or lowering the machine quill, the circle size can be adjusted to a precise existing hole size. This allows the operator to re-enter an existing hole.

In yet another embodiment, the center and edge finder can comprise an electrical circuit that connects to an electrical wire for connecting the laser module to an A/C power circuit. Although this configuration can be utilized with any type of laser module or other light source, it is particularly beneficial for use with laser modules having high power requirements, such as green light laser modules.

Accordingly, the primary objective of the present invention is to provide a center and edge finder for finding the center or edge of a workpiece in relation to the axis of a work tool spindle that provides the advantages discussed above and overcomes the disadvantages and limitations which are associated with presently available center and/or edge finder tools.

An important objective of the present invention is to provide a center and edge finder that provides a direct method of finding the center or edge of a workpiece relative to the axis of a work tool spindle so as to eliminate the potential error of not adding in one-half the diameter of the finder and the time necessary to make that calculation.

It is also an important objective of the present invention to provide a center and edge finder that utilizes a beam of light to align the axis of the work tool spindle with the center or edge of a workpiece, thereby eliminating the need to have physical contact between the finder and the workpiece.

It is also an important objective of the present invention to provide a center and edge finder that has a minimum of moving parts to improve reliability and simplify use of the finder to locate the center or edge of a workpiece relative to the axis of the spindle of a work tool.

It is also an important objective of the present invention to provide a center and edge finder that is adaptable to a wide variety of different work tools.

It is also an important objective of the present invention to provide a center and edge finder that comprises an electrically operated laser module to generate a beam of light that passes through a very small diameter opening in the finder's housing to locate the center or edge of a workpiece relative to the spindle of a work tool, such as a milling machine, lathe or the like.

Another important objective of the present invention is to provide a center and edge finder that utilizes a polarizing element that allows the operator to adjust the intensity and diameter of a beam of light emanating from an electrically operated laser module.

Another important objective of the present invention is to provide a center and edge finder that has a collet that is shaped and configured to beneficially engage the nozzle of a waterjet cutting tool so as to allow the operator to project a precise dot at the edge or center of a workpiece to locate where the cutting operation is to occur.

Yet another important objective of the present invention is to project a circular beam of light to place a ring-shaped light on the workpiece so the user can align the work tool with an aperture located on the workpiece or project a cross-hair beam of light to place a cross on the workpiece so the user can orient the workpiece to the x-y axis of the work tool.

Yet another important objective of the present invention is to provide a center and edge finder that has an electrically operated laser module that projects a green laser light.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention:

FIG. 2 is a side view of a center and edge finder configured according to a preferred embodiment of the present invention;

FIG. 3 is an exploded view of the center and edge finder of FIG. 2 showing the components thereof;

FIG. 4 is a side view of the lower housing component of the center and edge finder of FIG. 2;

FIG. 5 is an end view of the lower housing taken through 5-5 of FIG. 4 showing the second or lower end of a preferred embodiment of the center and edge finder of the present invention;

FIG. 6 is an end view of the lower housing taken through 6-6 of FIG. 4 showing the installed laser module of a preferred embodiment of the center and edge finder of the present invention;

FIG. 7 is a side view of the upper housing component of the center and edge finder of FIG. 2;

FIG. 8 is an end view of the upper housing taken through 8-8 of FIG. 4 showing the battery sleeve disposed therein;

FIG. 9 is a top view of the upper housing component of the center and edge finder of FIG. 2;

FIG. 10 is an end view of the upper housing component taken through 10-10 of FIG. 9;

FIG. 11 is a side view of the battery holder component of the center and edge finder of FIG. 2 with the battery button disposed therein;

FIG. 12 is an end view of the battery holder taken through 12-12 of FIG. 11;

FIG. 13 is an end view of the battery holder taken through 13-13 of FIG. 11;

FIG. 14 is a side view of a prior art waterjet cutting tool which can be utilized with the center and edge finder of the present invention;

FIG. 15 is the side view of an alternative embodiment of a center and edge finder having a shank configured to receive the downward projecting nozzle of the waterjet cutting tool of FIG. 14;

FIG. 16 is a top plan view of the center and edge finder of FIG. 15 taken through 16-16 of FIG. 15;

FIG. 17 is a cross-sectional side view of the shank utilized with the embodiment shown in FIG. 15 taken through 17-17 of FIG. 16;

FIG. 22 is a top view of a ring-shaped light made up of a plurality of fine dots;

FIG. 23 is a top view of a solid ring-shaped light;

FIG. 24 is a side view of an alternative embodiment of the present invention configured to project the ring-shaped light of FIG. 21 so as to align the work tool with an aperture located on a workpiece; and FIG. 25 is a side view of an alternative embodiment of the present invention showing an electrical wire for connecting to an A/C power system.

DETAILED DESCRIPTION OF THE PREFERRED EMBODIMENTS

With reference to the figures where like elements have been given like numerical designations to facilitate the reader's understanding of the present invention, and particularly with reference to the embodiment of the workpiece center and edge finder of the present invention illustrated in the figures, a preferred embodiment of the present invention is set forth below. The enclosed description and drawings are merely illustrative of one or more preferred embodiments and represent at least one of several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
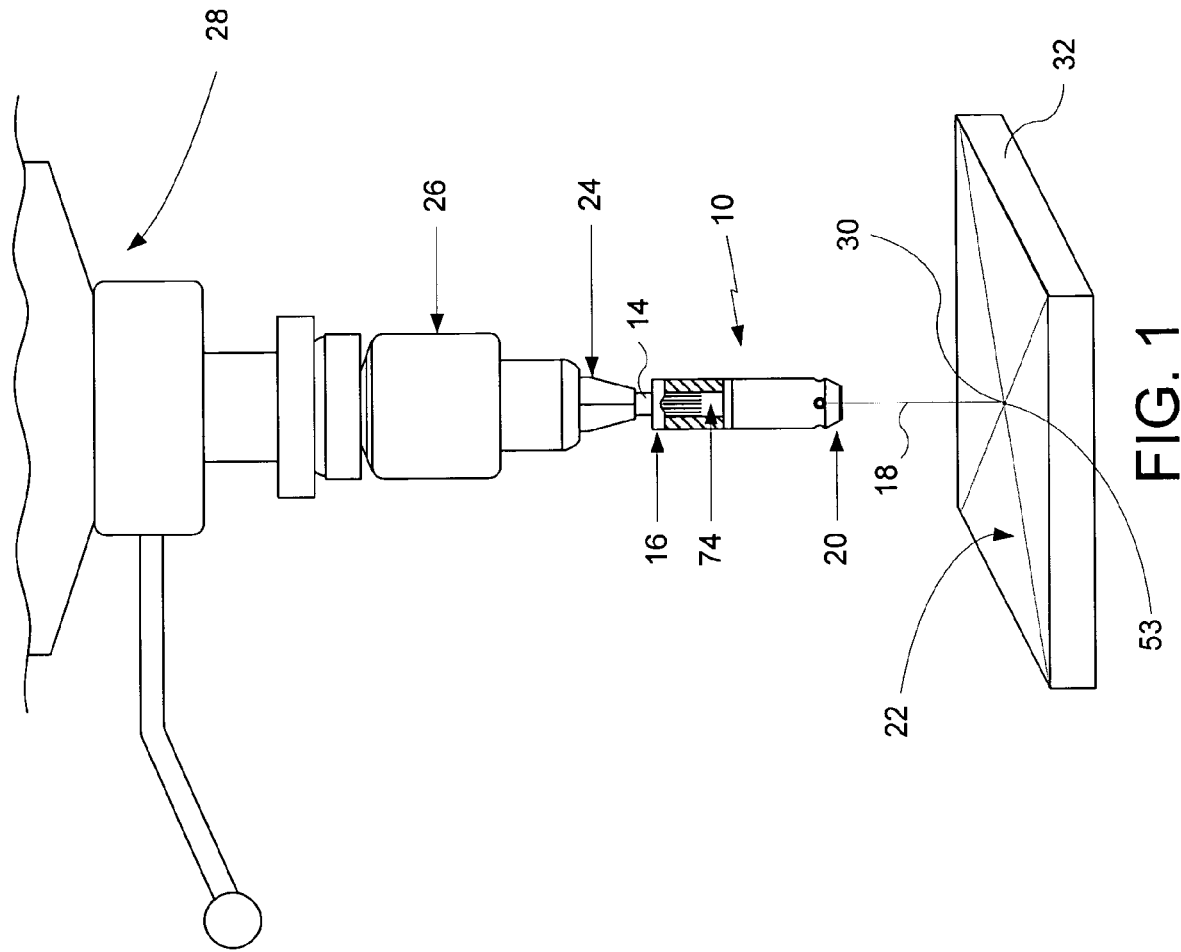
FIG. 1 is a perspective side view of a center and edge finder configured according to a preferred embodiment of the present invention shown mounted in an adjustable chuck of a milling machine spindle projecting a beam of light to the center position of a workpiece.

A center and edge finder manufactured out of the materials and configured pursuant to the principles of the present invention is shown generally as 10 in the figures. As shown in FIGS. 1 and 2, in a preferred embodiment center and edge finder 10 is configured generally with a support structure, such as housing 12, having a shank 14 at the first end 16 of housing 12 and configured to emit a beam of light, shown as 18 in FIG. 1, from the second end 20 of housing 12 towards workpiece 22. In the preferred embodiment, shank 14 is adapted to be engagedly received in the chuck or collet 24 of the spindle 26 portion of a work tool 28, such as a milling machine or the like, in order to find the center 30 or edge 32 locations of workpiece 22 so as to align the vertical axis of spindle 26 therewith so the desired work operations, such as milling, and the like, can be performed at the proper locations on workpiece 22. In the preferred embodiment, housing 12 comprises an upper housing 34 and a lower housing 36 that are threadably connected together to form one or more compartments therein, such as battery compartment 38 and light compartment 40 (shown in FIG. 3). Also in the preferred embodiment, shank 14 is integral with upper housing 34 and housing 12 and shank 14 are made out of aluminum. As will be readily apparent to those skilled in the art, a number of variations can be made to these components. For instance, finder 10 can be manufactured without shank 14 such that the upper housing 34 is configured to be directly received in and engaged by chuck 24 of work tool 28. In addition, housing 12 can be a single piece unit and it and the other components of finder 10 can be made out of a variety of different materials, including various metals, plastics and composites. As explained in more detail below, finder 10 of the present invention utilizes beam of light 18 to provide direct indication of the center 30, edge 32 or other specific spot of workpiece 22, thereby eliminating the requirement to make adjustments and the need to physically contact finder 10 against the workpiece 22.

As stated above, in the preferred embodiment of finder 10 of the present invention housing 12 is a two-piece component comprising upper housing 34 threadably engaged with lower housing 36. Although housing 12 can be a single component or comprise more than two sub-housing components, use of upper 34 and lower 36 housings is preferred for ease of manufacturing and replacement of the batteries, shown as 42 in FIG. 3, as needed by the user. To facilitate the joining of upper 34 and lower 36 housings into housing 12, in the preferred embodiment upper housing 34 has a threaded end 44 configured to be threadably received in the internally threaded open end 46 of lower housing 36 so as to form a chamber 48 defining the aforementioned battery compartment 38 and light compartment 40 for containing the preferred electrical power and light components necessary to operate finder 10 of the present invention. Although chamber 48 can be completely enclosed, for instance if finder 10 is to be used in a wet environment, in the preferred embodiment battery compartment 38 is at least partially open (as best shown in FIGS. 3 and 9) to allow the user to easily provide power for the beam of light 18. Use of threaded ends to join the two housing components upper housing 34 and lower housing 36 provides the user with relatively easy access to replace batteries 42, the preferred source of electrical power for finder 10, as needed. Although the figures and description set forth herein show and describe housing 12 being divided between battery compartment 38 and light compartment 40, those skilled in the art will recognize that the present invention is not so limited. For instance, housing 12 can be divided at a location closer either to first end 16 or second end 20, with both battery compartment 38 and light compartment 40 in same separate housing component of housing 12. As an example, first end 16 can be configured such that a section of housing 12 threadably separates from the shank 14 to allow the user to remove batteries 42 through the open first end 16 of housing 12. In yet another alternative embodiment, likely not preferred, housing 12 can be sealed to permanently enclose batteries 42 into chamber 48 such that finder 10 is disposed once the batteries are fully discharged.

To provide the beam of light 18, finder 10 includes a light unit 50 that is connected to a source of electrical power, which in the preferred embodiment is batteries 42. The preferred light unit 50 is configured to require a relatively small amount of electrical power to operate so as to generate light beam 18. As shown in FIG. 3, one or more batteries 42 of the micro cell type (i.e., 1.5 volt batteries) will generally be sufficient to power light unit 50 and provide a sufficient beam of light 18 for use to find the center 30 or edge 32 of workpiece 22, which will typically only require the beam of light 18 to travel less than twelve inches. Although the use of one or more regular disposable alkaline batteries is preferred, those skilled in the art will recognize that a variety of different types and configurations of batteries 42 will be adaptable for use with finder 10 of the present invention. In an alternative embodiment, batteries 42 can be of the rechargeable type and finder 10 be configured to allow the user to recharge batteries 42. In this embodiment, housing 12 can be sealed to prevent the user from removing batteries 42. In yet another alternative embodiment, finder 10 can comprise suitable wiring or other electrical mechanism to electrically connect light unit 50 with an external source of electrical power, such as a source of AC electricity. In one configuration of this embodiment, the electricity can be delivered through the connection between shank 14 and spindle 26 of work tool 28.

In the preferred embodiment of finder 10, light unit 50 has a source of light 52 that is configured to direct a concentrated, visible beam of light 18 towards and onto workpiece 22, as shown in FIG. 1. The preferred source of light 52 is a laser diode module that can deliver a straight, true beam of light 18, such as those utilized in laser pens, pointers and remotes. The preferred laser diode module 52 is one that includes an integrated optic, laser diode and driver circuit, such as those commercially available from Quartron USA Inc. out of Walnut, Calif. In general, this type of light source is preferred due to the relatively lower power requirements and usage, durability and ability to generate a straight and true beam of light. As set forth below, in the preferred embodiment second end 20 of housing 12 is configured to provide a beam of light 18 that ends up as a very fine dot, shown as 53 on FIG. 1, on workpiece 22 so that precise identification of center 30 or edge 32 of workpiece 22 can be achieved by the user. Although other types of light generating devices, including light bulbs and the like, can be utilized for source of light 52, it is believed that the laser diode module light source is preferred due to the features described above. As is well known, if the lens or other optics are not built-in to or otherwise incorporated with source of light 52, then finder 10 will need to have a focusing lens at or near second end 20 of housing 12. The lens can have a fixed focal length or be an adjustable focus lens.

As best shown in FIG. 3, the laser diode module 52 of finder 10 is positioned in a module chamber 54 in an elongated light tube 56 disposed in light compartment 40 of lower housing 36. In the preferred embodiment, laser diode module 52 is fixedly attached to the interior of module chamber 54 and configured to discharge light through light tube 56 towards second end 20 of housing 12. In the preferred embodiment, light tube 56 is made out of brass or other electrically conductive material so as to complete an electrical circuit, with housing 12, interconnecting batteries 42 and laser diode module 52. To secure light tube 56 in light compartment 40, finder 10 of the present invention includes a light tube sleeve 58 around the first end 60 of light tube 56 that is configured to tightly hold light tube, and therefore laser diode module 52, in place inside light compartment 40 near open end 46 thereof. In the preferred embodiment, light tube sleeve 58 is made out of a non-electrically conductive material, such as plastic, that is suitable for securing light tube 56 in light compartment 40. In one embodiment, the inventor has found that the plastic acetal works well for light tube sleeve 58. With the first end 60 of light tube 56 secured at or near open end 46 of light compartment 40, the second end 62 of light tube 56 is at or near the generally closed end, except as explained below, of light compartment 40 that forms second end 20 of housing 12. As shown in FIG. 3, a spring 64 is attached to laser diode module 52 to bias against batteries 42 so as to maintain laser diode module 52 in electrical contact therewith.

As will be recognized by those skilled in the art, to complete the electrical circuit between batteries 42 and laser diode module 52 without the use of wires, the brass light tube 56 must contact housing 12. One way of achieving the necessary contact is with the use of an adjusting mechanism comprising one or more sets of adjusting members 66, such as screws, disposed in a side aperture 68 on lower housing 36, as best shown in FIG. 3. The adjusting mechanism is configured to align the light from laser diode module 52, or other source of light, with the centerline of spindle 26. In the preferred embodiment of the present invention, the light from laser diode module 52 passes through light discharge aperture 70 in the end face 72 at the second end 20 of housing 12, as best shown in FIG. 5. Whether due to wear on the work tool 28, such as worn quill bearings, or from the user dropping or otherwise hitting finder 10 hard, it is possible for the finder 10 to become unaligned relative to the centerline of spindle 26. In addition, use of finder 10 on different machines may require aligning finder 10 for the new machine. The user can determine that re-alignment is necessary when rotation of chuck 24 with finder 10 therein results in a circle of light instead of a fine dot 53 on the target area. In the preferred embodiment, four equally spaced adjusting members 66 are utilized, one each for four side apertures 68 that are equally spaced around the circumference of lower housing 36. In this manner, the user can utilize a north-south, east-west alignment process to obtain the desired fine dot 53 on the target area. For best alignment purposes, preferably four or at least three such adjusting members 66 are utilized. In a preferred embodiment adjusting members 66 are threadably received by apertures 68 and threaded in and out thereof with an allen wrench, screwdriver or equivalent type of tool to apply more or less force to the second end 62 of light tube 56, in which laser diode module 52 is disposed. In an alternative embodiment, adjusting members 66 comprise an outwardly extending knob or other like device to allow the user to thread adjusting member 66 in and out of side apertures 68 without the use of a tool. In yet another alternative embodiment, adjusting members 66 may be other types of devices than the threaded members which are received in side apertures 68. In any such configuration, the user selectively moves or otherwise operates one or more adjusting members 66 to interact with the light from source of light 52, such as the laser diode module, until the beam of light 18 produces a fine dot 53 on the target area. As stated above, in the preferred embodiment this requires the user to thread adjusting members in and out of their respective side apertures 68.

To accomplish the completed electrical circuit, one or more of adjusting screws 66 need to be made out of material sufficient to electrically interconnect source of light 52, which in the preferred embodiment is in light tube 56, with housing 12. Those skilled in the art will recognize that there are other ways to complete the necessary electrical circuit between laser diode module 52 and batteries 42 than through the use of light tube 56, adjusting screws 66 and housing 12 set forth in the preferred embodiment of the present invention. However, as described above, these components of the electrical circuit provide the alignment function in the finder 10 of the present invention. In addition, as described below, the use of housing 12 as part of the electrical circuit allows finder 10 to be provided with an on/off switch that utilizes the connection or separation of housing 12 from batteries 42 as a mechanism to provide or break the flow of power to source of light 52 to generate the beam of light 18. As explained in more detail below, in the preferred embodiment the electrical circuit between batteries 42 and laser diode module 52 is broken by separating the electrical contact between a portion of housing 12 and batteries 42. When this contact is broken, electricity will not flow to laser diode module 52, thereby preventing the generation of beam of light 18. As will be readily apparent to those skilled in the art, various different configurations can be utilized to separate a portion of housing 12 from batteries 42 so as to break the electrical circuit.

In a preferred embodiment of the present invention, finder 10 includes an on/off switch that is incorporated with battery holder 74, which is rotatably disposed in battery holder compartment 38 of upper housing 34 (as shown in FIGS. 1 through 3 and 7), and configured to selectively connect or interrupt the electrical circuit between housing 12 and batteries 42 so as to selectively provide power to laser diode module 52. In the preferred embodiment, battery holder 74 is a generally cylindrically shaped tubular member made out of a non-conductive material, such as acetal, having a closed first end 76 and an open second end 78. The closed first end 76 has an end piece 80 and open second end 78 is sized and configured to receive and store batteries 42 within battery holder 74. The external diameter of battery holder 74 is sized such that it smoothly rotates within battery compartment 38. In manufacturing, end piece 80 is provided with a generally centrally disposed aperture, not shown, which is sized and configured to receive the stem 82 of an electrically conductive battery button 84 which is placed within battery holder 74 at the first end thereof such that stem 84 extends generally outwardly from end piece 80, as best shown in FIGS. 2 and 13, to contact end wall 86 (best shown in FIG. 10) of battery compartment 38 at the first end 16 of housing 12 to complete the electrical circuit between batteries 42 and laser diode module 52. As shown in FIG. 2, stem 82 of battery button 84 electrically interconnects batteries 42 to end wall 86. To allow the user to selectively allow electricity to flow from batteries 42 to laser diode module 52 to generate beam of light 18, an on/off function is incorporated with battery holder 74. In a preferred embodiment, the on/off function is achieved through the cooperation of an outward extending projecting member 88 on end piece 80 and a recess portion 90 on end wall 86 of battery compartment 38. An on/off indicator mark 92 on the side wall 94 of battery holder 74 is configured to be within cut-out area 96 at first end 16 when finder 10 is in an on condition, meaning beam of light 18 is emanating from second end 20 of housing 12. Side wall 94 also includes one or more ridges 98 to facilitate the user rotating battery holder 74 in battery compartment 38 of upper housing 34. Projecting member 88 and recess portion 90 are positioned such that when on/off indicator mark 92 is within cut-out area 96, projecting member 88 is disposed within recess portion 90, providing contact between stem 82 of battery button 84, completing the electrical circuit and placing finder 10 in an on condition. When the user rotates battery holder 74, by first gently pushing downward on battery holder 74 to move projecting member 88 out of recess portion 90, the action of projecting member 88 against end wall 86 of battery compartment 38 maintains stem 82 in a spaced apart position relative to end wall 86, thereby severing the electrical circuit and placing finder 10 in its off condition. Until battery holder 74 is rotated to place on/off indicator mark 92 in cut-out area 96, projecting member 88 will maintain the spaced apart relation between stem 82 and end wall 86, thereby preventing accidental operation of finder 10 that would prematurely shorten the useful life of batteries 42. If desired, the top of the walls 100 of battery compartment 38 can be tapered to provide comfortable and more smooth operation of battery holder 74 within battery compartment 38.

As set forth above, light from laser diode module or other source of light 52 passes through discharge aperture 70 in end face 72 at the second end 20 of housing 12 to project fine dot 53 onto or alongside workpiece 22. If laser diode module 52 does not include a lens, then the lens will generally be located between laser diode module 52 and discharge aperture 70. To obtain the desired fine beam of light 18 that results in very fine dot 53 on workpiece 22, it is preferred that discharge aperture 70 be very small sized. In a preferred embodiment of the present invention, the inventor has found that a discharge aperture 70 having an opening of approximately 0.0035 inches diameter provides sufficient light to pass to generate the beam of light 18 but still provide a very fine dot 53 on workpiece 22. A discharge aperture 70 sized and configured to provide such fine dot 53 has the advantage to the user of being able to directly and more precisely identify the center 30 or edge 32 of workpiece 22. To help protect discharge aperture 70 from damage by contact against a surface, end face 72 of the preferred embodiment is recessed approximately 0.030 inches relative to the second end 20 of housing 12, as generally shown in FIG. 5.

To be useful for different types of work tools 28, which may have different sized chucks 24, finder 10 of the present invention can be provided with different sizes of shank 14. For instance, finder 10 can be provided with shank 14 having diameters of ¼", ⅜", ½", 6 mm and 10 mm with a length of approximately ⅝" to 1". As previously stated, for some work tools 28 it may be preferred to grasp finder 10 at or near the first end 16 of housing 12, thereby eliminating the need for shank 14 altogether. In other circumstances, it may be preferred to have finder 10 directly incorporated into work tool 28. Typically, however, finder 10 is provided such that it is installed in chuck 24 to align spindle 26 of work tool 28 and then removed to place a mill tool or drill bit in chuck 24 so that mill tool or drill bit is in alignment with the centerline of spindle 26.

In a preferred embodiment, housing 12 is made out of aluminum, light tube 56 and battery button 84 are made out of brass and acetal is utilized for the plastic components. In one embodiment, upper housing 34 is approximately 2.20 inches long, with an approximately 0.25 inch long threaded end 44 and 0.625 inch long battery compartment 38, and lower housing 36 is approximately 1.25 inches long with an approximately 0.0035 inch discharge aperture 70. In use with the preferred embodiment, the user places shank 14 of finder 10 in chuck 24 and engages the chuck mechanism to secure finder 10 to the work tool 28, such as a milling machine. The workpiece 22 is secured to the table (not shown) of work tool 28 so that workpiece 22 can be selectively moved under finder 10 to find the center 30 or edge 32 thereof. The user turns finder on by pressing his or her thumb against battery holder 74 and applying a slight downward and rotating motion thereto so as to move indicator mark 92 to the cut-out area 96 of housing 12. This causes the projecting member 88 at the second end 78 of battery holder to be inserted into recess portion 90, bringing the stem 82 into contact with end wall 86 of battery compartment, thereby completing the electrical circuit between batteries 42 and housing 12 so as to allow power to flow to the laser diode module 52 and generate the beam of light 18 towards workpiece 22. To check alignment, the user hand rotates spindle 26 to see if the light produces a fine dot 53 or a circular path, in which case alignment is needed. To adjust the alignment, the user provides a mark, such as an "x" at two crossing lines, and operates one or more of adjusting members 66 to move it in or out of its respective side aperture 68 to move laser diode module 52, which in the preferred embodiment is in light tube 56, until the beam of light 18 produces the desired fine dot 53. Once the finder 10 is aligned with the centerline of spindle 26, the user can directly find either or both the center 30 or edge 32 of workpiece 22. To find the center 30 of workpiece 22, the user merely moves workpiece 22 until the beam of light 18 from finder 10 produces the fine dot 53 at the previously marked (i.e., punched) center 30. To find the edge 32 of workpiece 22, workpiece 22 is moved until the beam of light 18 from finder 10 is projecting down the edge 32 of workpiece 22. In either use, finder 10 of the present invention directly finds the center 30 or edge 32 of workpiece 22, thereby eliminating the need to make any calculation adjustments, without having to physically contact workpiece 22, thereby avoiding potential damage to workpiece 22 or the precision tool.

In another embodiment of the present invention, center/edge finder 10 is configured for use with waterjet cutting systems that are commonly used to cut high strength materials, such as stainless steel and titanium, and high strength lightweight composites, such as carbon fiber composites, as well as a wide variety of other materials. In this embodiment, work tool 28 is a waterjet cutting tool 108 having a downward projecting nozzle 110 having a tip 112 at the distal end 114 of nozzle 110. In the typical configuration, pressurized water from water supply line 116 and an abrasive material from abrasive supply line 118 flow through nozzle 110 to cut workpiece 22 to the desired shape and size or with the desired characteristics (i.e., holes, grooves and etc.). As with milling machines, drill presses and other work tools 28 described above, it is very important to properly align the downwardly projecting work component (i.e., the nozzle 110) of waterjet cutting tool 108 with the location where the cutting or other work operation will be performed so that the work operation will not be wasted and result in a wasted workpiece 22. As described in more detail below and shown in FIGS. 15 through 18, center/edge finder 10 of the present invention can significantly assist in the alignment process when using waterjet cutting tool 108 and other work tools having an outwardly (typically downwardly) projecting work component by utilizing center/edge finder 10, once it is attached, in the same manner as described above.

In the embodiment of center/edge finder 10 for use with waterjet cutting tool 108 and other work tools having a projecting work component, such as nozzle 110, the shank 14 of center/edge finder 10 is modified to receive nozzle 110 therein instead of being received into the chuck 24 of the work tools 28 set forth above. A center/edge finder 10 with a modified shank 14 is shown in FIG. 15. In the preferred embodiment, shank 14 is integral with housing 12 and has one or more shank walls 120 that define a shank chamber 122 inside shank 14, which is preferably sized and configured to tightly engage nozzle 110 (i.e., the inside diameter of shank chamber 122 is slightly larger than the outside diameter of nozzle 110). Center/edge finder 10 is installed on waterjet cutting tool 108 by inserting the tip 112 of nozzle 110 into the opening 124 at the proximal end 126, relative to tool 108, of shank chamber 122 and sliding center/edge finder 10 upward until tip 112 is in abutting relation with the bottom of the tapered section 128 at the distal end 130 of shank chamber 122. To ensure that the longitudinal centerline of the nozzle 110 is aligned with the centerline of the center/edge finder 10, the tapered section 128 should be sized and configured to enable center/edge finder 10 to be self-aligning relative to nozzle 110. In this manner, the fine dot 53 projected by the light source 52 of center/edge finder 10 will be in direct alignment with the centerline of nozzle 110 of waterjet cutting tool 108. For other types of work tools, the fine dot 52 will be in direct alignment with the centerline of the work component, which is typically downwardly or outwardly projecting, thereof.

Nozzle 110 generally has a smooth outer surface. As such, the inside diameter of shank chamber 122 can be sized and configured to be slightly smaller than the outside diameter of nozzle 110, with one or more slots 132 provided in shank wall 120 to allow shank chamber 122 to slightly expand so that shank 14 will tightly engage, by gripping, nozzle 110. Preferably, however, the engagement of center/edge finder 10 is not so tight that the user will have any difficulty removing the center/edge finder 10 from nozzle 110 or that such removal will change the alignment of the centerline of nozzle 110 with the location on workpiece 22 where the work operation is to be performed. For other work components, it may be preferable to provide the shank 14 of center/edge finder 10 with a securing mechanism, not shown, that removably secures shank 14 to the subject work component. As an example, shank wall 120 can be provided with one or more apertures in which a set screw or other connector is threadably received such that the connector is threaded inward to engage the outer surface of the work component to hold center/edge finder 10 thereon and is threaded outward to allow removal of center/edge finder 10 therefrom.

In use to cut, drill or perform some other work operation on workpiece 22, the user slides or otherwise engages shank 14 of center/edge finder 10 onto the nozzle 110 of waterjet cutting tool 108 or onto the work component of other work tools 28. In the preferred configuration of this embodiment, the sliding engagement is sufficient to hold center/edge finder 10 on nozzle 110. In an alternative configuration, the user utilizes one or more securing mechanisms to securely engage shank 14 onto nozzle 110. Once center/edge finder 10 is secured to nozzle 110, the user merely moves workpiece 22 around until the beam of light 18 from finder 10 produces the fine dot 53 at the previously marked (i.e., etched or punched) location where the work operation is to be performed or at a location which is used as a reference point (i.e., center 30 or edge 32 of workpiece 22). In either use, finder 10 of the present invention directly finds the marked location, center 30 or edge 32 of workpiece 22, thereby eliminating the need to make any calculation adjustments, without having to physically contact workpiece 22, thereby avoiding potential damage to workpiece 22 or the work tool 28 or 108. Once the fine dot 53 is at the desired work operation location, the user removes center/edge finder 10 from the nozzle 110 or other work component to perform the desired work operation at the precise location intended.

Figure 20:
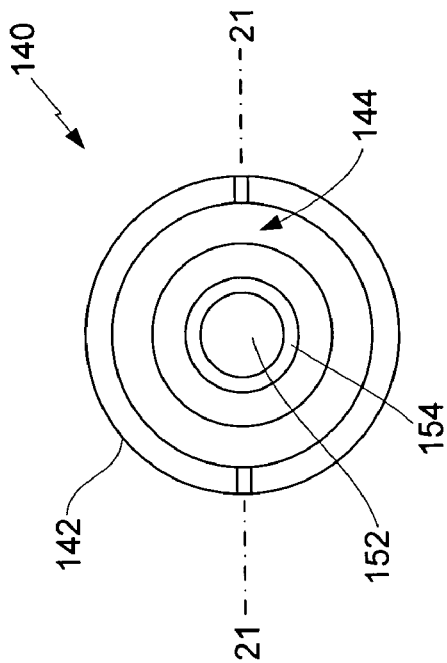
FIG. 20 is a top plan view of the dot adjusting unit of FIG. 15.
Figure 21:
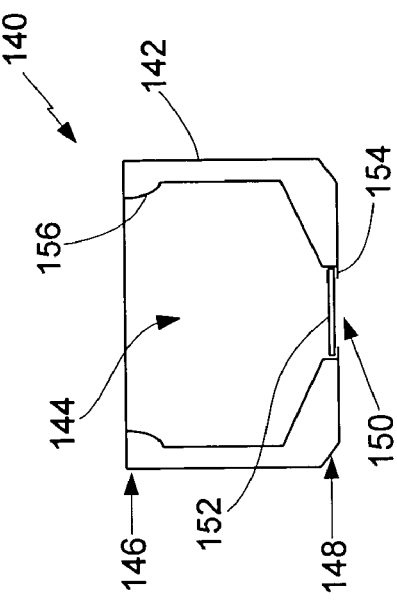
FIG. 21 is a cross-sectional side view of the dot adjusting unit of FIG. 20 taken through 21-21 thereon.
Figure 19:
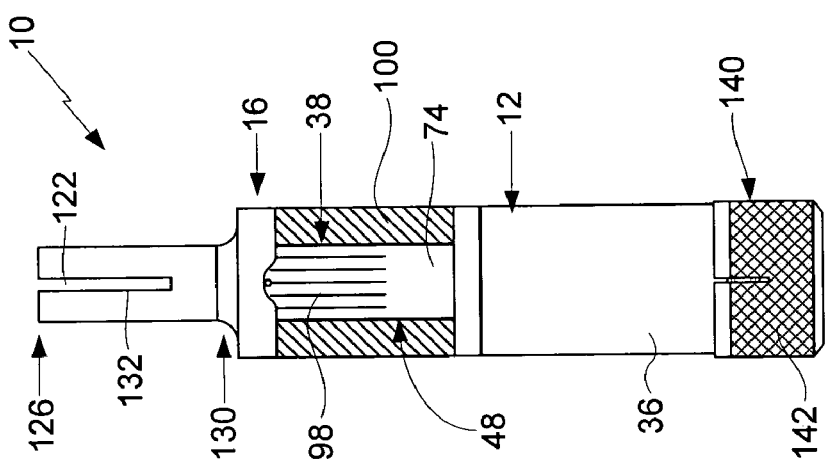
FIG. 19 is a side view of an alternative embodiment of the center and edge finder of the present invention showing use of a dot adjusting unit at the second end of the finder housing of FIG. 15.
Figure 18:
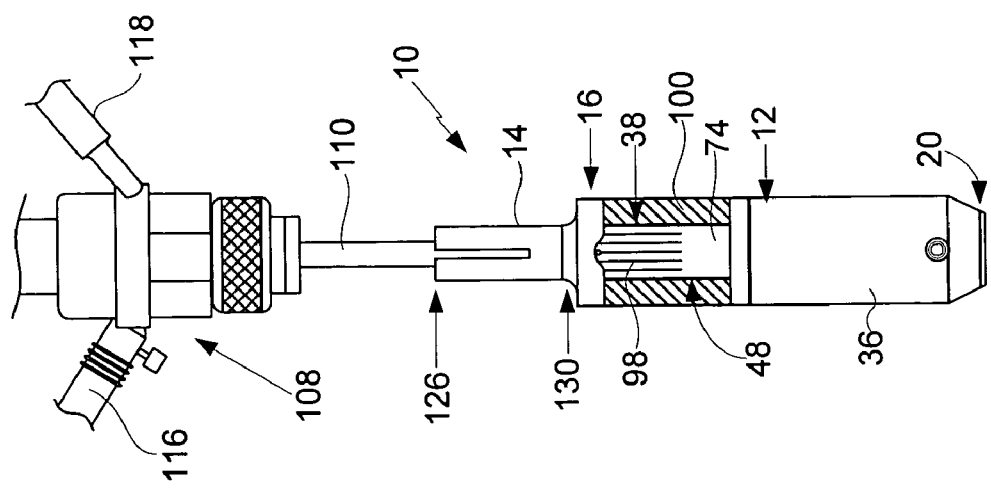
FIG. 18 is a side view of the embodiment of FIG. 15 attached to the nozzle of a waterjet cutting tool.

In another embodiment of the present invention, center/edge finder 10 has a dot adjusting unit 140, shown in FIGS. 19 through 20, that is configured to adjust the intensity of the beam of light 18 to control the size of the fine dot 53 projected on workpiece 22, thereby making it easier and more accurate to view on a variety of surfaces. As known to those skilled in the art, the diffraction pattern resulting from projecting a beam of light 18 through a small opening and the scattering of the beam 18 as it impacts against a reflective surface, such as the surface of an aluminum, stainless steel, titanium or other metals, creates a "halo" effect around the primary "hot spot" at the center of the beam 18. By adjusting the intensity of the beam 18, the user can substantially reduce or eliminate this halo ring, thereby making the primary hot spot, which is fine dot 53, easier to see. In one embodiment, shown in the figures, dot adjusting unit 140 is a separate component that attaches to the second end 20 of housing 12. In an alternative embodiment, dot adjusting unit 140 is an integral part of center/edge finder 10, such as being built into housing 12 and disposed between the source of light 52 and discharge aperture 70 or positioned between discharge aperture 70 and workpiece 22.

In the embodiment shown, the attachable dot adjusting unit 140 has a cap housing 142 defining a cap cavity 144 that is sized and configured to tightly, but removably, slide onto and rotatably engage second end 20 of housing 12 of center/edge finder 10. The first end 146 of cap housing 142 is open to receive housing 12 therein. The second end 148 of cap housing 142 is provided with an cap orifice 150 sized to allow beam of light 18 to pass therethrough. Located at cap orifice 150 is a polarizing element 152 configured to polarize the beam of light 18 so as to adjust its intensity and more specifically define fine dot 53. In the embodiment shown, polarizing element 152 is disposed on an inwardly projecting ledge 154 at orifice 150. Polarizing element 152 can be fixedly built into cap housing 142 at or near orifice 150 or it can be removably placed onto ledge 154 to allow the user to change polarizing element 152 to one that better suits his or her needs. In the preferred embodiment, polarizing element 152 is a section of linear polarizing film that is cut to fit on ledge 154 at orifice 150. If desired, one or more engaging projections 156 can be positioned on cap housing 142 inside cap cavity 144 to assist in engaging center/edge finder 10. As shown in FIG. 17, engaging projections can be molded into cap housing 142 at or near its first end 146. Dot adjusting unit 140 can be utilized with center/edge finder 10 having shank 14 that is inserted into chuck 24 or which receives a projecting work component, such as nozzle 110.

With dot adjusting unit 140, center/edge finder 10 can be provided with a larger diameter discharge aperture 70 than that described above. For instance, instead a diameter of 0.0035 inches it can have a diameter of 0.0055 inches. The larger size diameter discharge aperture 70 can provide a beam of light 18 that produces a fine dot 53 that is easier for the user to see under certain lighting conditions, such as fluorescent shop lights or the like. The user can adjust the beam of light to be a very fine dot 53 that is sufficiently large enough to see under the lighting conditions be utilized. In use with the embodiment shown, the user places the open first end 146 of cap cavity 144 onto the second end 20 of housing 12 until cap housing 142 is secured onto housing 12 of center/edge finder 10 and the polarizing element 152 is near discharge aperture 70. If dot adjusting unit 140 is integral with the center/edge finder 10, then this step is not necessary. The user then rotates dot adjusting unit 140 to obtain a fine dot 53 that is as fine as possible yet one which he or she is able to see under the lighting conditions and the user's ability to see. Once workpiece 22 is properly positioned under work tool 28, the user can perform the desired work operation.

In another embodiment of the present invention, shown in FIGS. 22 through 24, center/edge finder 10 is configured to emit a circle beam of light 160 toward workpiece 22 that projects ring-shaped light 162 thereon, which can be utilized to align work tool 28 with an existing aperture, such as 164 shown in FIG. 24. As known to those skilled in the art, there are times when it would be more convenient or beneficial to perform the work operation on workpiece 22 at a location that is measured from an existing aperture 164 rather than the center 30 or edge 32 of workpiece 22. To achieve the desired ring-shaped light 160, end face 72 of center/edge finder 10 can be provided with a plurality of discharge apertures 70 that emit circle beam of light 160 and produces a plurality of fine dots 53, as shown in FIGS. 22 and 24, to define ring-shaped light 162 on workpiece 22. Alternatively, the ring-shaped light 162 can be achieved by utilizing a glass lens at discharge aperture 70 that has a circle scratched or cut into the lens to project a solid, but very fine, ring-shaped light 162, as shown in FIG. 23, or with a plurality of holes to produce the plurality of fine dots 53. In either embodiment, center/edge finder 10 is utilized much the same way as described above, such as for the chuck 24 and the projecting work component 110 configurations of work tools 28, except that the alignment calculations are made relative to aperture 164 instead of center 30 or edge 32 of workpiece 22. By raising or lowering the machine quill, the diameter of the ring-shaped light 162 can be adjusted to a precise existing hole size, which allows the operator to re-enter an existing aperture 164. If desired, this embodiment can also be utilized with the dot adjusting unit 140 configuration set forth above.

Instead of projecting a circle-shaped beam of light, center and edge finder 10 of the present invention can be configured to project a cross-hair shaped beam of light to place a cross or cross-like shape light on workpiece 22 so the operator can directly align workpiece 22 to the x-y axis of the work tool 28. As above, this can be accomplished by emitting a plurality of fine dots 53 in the cross-hair shape (i.e., the cross on the workpiece 22 is made up of the fine dots) or by etching a cross-hair shape into a lens to project a solid, but very fine, cross onto workpiece 22.

In yet another embodiment of the present invention, center/edge finder 10 can be provided with a source of light 52 that is or comprises a green laser module that emits a green laser instead of the standard red laser for fine dot 53. Use of the green light is preferred in certain circumstances. One major disadvantage of the green laser modules is that they require much more energy than standard red laser modules. For instance, batteries that can provide a beam of light 18 for three hours or more with the red laser module can only provide four minutes with the green laser module. To provide sufficient power for source of light 52 for the green laser, center/edge finder 10 includes an A/C electrical circuit that interconnects source of light 52 with electrical wire 166, as shown in FIG. 25, which is plugged into a source of A/C power, such as a standard A/C outlet. If desired, a step-down transformer 168 can be utilized to regulate the voltage to center and edge finder 10. This embodiment can be utilized with any of the chuck 24, projecting work component 110, dot adjusting unit 140 and ring-shaped light 162 configurations, or combinations thereof, set forth above.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, there are numerous components described herein that can be replaced with equivalent functioning components to accomplish the objectives of the present invention. One such modification is the use of different materials than those set forth herein. Another modification would be a change in the dimensional characteristics of the various components.

What is claimed is:

1. A center and edge finder utilized in conjunction with a work tool to directly locate a center or an edge of a workpiece with respect to a centerline of said work tool, said center and edge finder comprising:
    a support structure having a first end secured to said work tool and a second end generally disposed in spaced apart relation generally above said workpiece, said support structure comprising a shank having a shank chamber sized and configured to receive a work component of said work tool;
    a light source supported by said support structure, said light source configured to emit a beam of light from said support structure towards said workpiece, said beam of light aligned with said centerline of said work tool to project a fine dot on said workpiece, said fine dot in direct alignment with said centerline of said work tool; and
    a source of electrical power electrically connected to said light source,
    whereby said beam of light is directed from said support structure to said center or said edge of said workpiece to align the location of said center or said edge of said workpiece with said centerline of said work tool so that one or more work operations may be performed on said workpiece.

2. The center and edge finder according to claim 1, wherein said work component has a tip at a distal end thereof and said shank chamber has a tapered section at a distal end thereof that is shaped and configured to receive said tip.

3. The center and edge finder according to claim 2, wherein said tapered section aligns said fine dot with said tip of said work component.

4. The center and edge finder according to claim 3, wherein said work component is a nozzle.

5. The center and edge finder according to claim 1 further comprising means interconnecting said shank and said work component for securing said shank to said work component.

6. The center and edge finder according to claim 1 further comprising a discharge aperture configured to narrow said beam of light so as to define said fine dot.

7. The center and edge finder according to claim 1, wherein said light source is a laser and said source of electrical power comprises one or more batteries.

8. The center and edge finder according to claim 1 wherein said light source is electrically connected to an electrical wire and said source of electrical power is an A/C system, said electrical wire configured to connect to said A/C system.

9. The center and edge finder according to claim 1, wherein said workpiece has an aperture thereon and said light source projects a ring-shaped light onto said workpiece, said ring-shaped light sized and configured to directly align said work tool with said aperture.

10. The center and edge finder according to claim 9, wherein said ring-shaped light comprises a plurality of said fine dots.

11. The center and edge finder according to claim 1 further comprising a dot adjusting unit on said support structure configured to adjust the size and/or visibility of said fine dot.

12. The center and edge finder according to claim 11, wherein said dot adjusting unit comprises a polarizing element.

13. The center and edge finder according to claim 12, wherein said polarizing element is disposed inside a cap cavity defined by a cap housing, said cap cavity sized and configured to be placed on said support structure.

14. The center and edge finder according to claim 13, wherein said support structure has a housing enclosing said light source, said cap housing rotatably attached to said housing.

15. A center and edge finder utilized in conjunction with a work tool to align a centerline of said work tool with an aperture on a workpiece, said center and edge finder comprising:
    a support structure having a first end secured to said work tool and a second end generally disposed in spaced apart relation generally above said workpiece;
    a light source supported by said support structure, said light source configured to emit a circle beam of light from said support structure towards said workpiece, said circle beam of light aligned with said centerline of said work tool to project a ring-shaped light on said workpiece, said ring-shaped light sized and configured to directly align said work tool with said aperture; and
    a source of electrical power electrically connected to said light source,
    whereby said circle beam of light is directed from said support structure to said aperture on said workpiece to align the location of said aperture with said centerline of said work tool so that one or more work operations may be performed on said workpiece.

16. The center and edge finder according to claim 15, wherein said ring-shaped light comprises a plurality of fine dots.

17. The center and edge finder according to claim 15 further comprising a dot adjusting unit on said support structure configured to adjust the size and/or visibility of said fine dot.

18. The center and edge finder according to claim 17, wherein said dot adjusting unit comprises a polarizing element disposed inside a cap cavity defined by a cap housing, said cap cavity sized and configured to be placed on said support structure.

19. The center and edge finder according to claim 15, wherein said support structure comprises a housing and said light source is a laser.

20. The center and edge finder according to claim 19, wherein said source of electrical power comprises one or more batteries disposed in said housing.

21. The center and edge finder according to claim 19, wherein said light source is electrically connected to an electrical wire and said source of electrical power is an A/C system, said electrical wire configured to connect to said A/C system.

22. A center and edge finder utilized in conjunction with a work tool to directly locate a center or an edge of a workpiece with respect to a centerline of said work tool, said center and edge finder comprising:

a support structure having a first end secured to said work tool and a second end generally disposed in spaced apart relation generally above said workpiece;

a light source supported by said support structure, said light source configured to emit a beam of light from said support structure towards said workpiece, said beam of light aligned with said centerline of said work tool to project a fine dot on said workpiece, said fine dot in direct alignment with said centerline of said work tool;

a source of electrical power electrically connected to said light source; and a dot adjusting unit on said support structure, said dot adjusting unit configured to adjust the size and/or visibility of said fine dot, whereby said beam of light is directed from said support structure to said center or said edge of said workpiece to align the location of said center or said edge of said workpiece with said centerline of said work tool so that one or more work operations may be performed on said workpiece.

23. The center and edge finder according to claim 22, wherein said light source is electrically connected to an electrical wire and said source of electrical power is an A/C system, said electrical wire configured to connect to said A/C system.

* * * * *